United States Patent
Park et al.

(10) Patent No.: US 8,798,792 B2
(45) Date of Patent: Aug. 5, 2014

(54) DETECTING APPARATUS OF ROBOT CLEANER AND CONTROLLING METHOD OF ROBOT CLEANER

(75) Inventors: Dong-Woo Park, Seoul (KR); Sung-Woon Kim, Seoul (KR); Dong-Hoon Yi, Seoul (KR); Jeong-Suk Yoon, Seoul (KR); Jong-Il Park, Seoul (KR); Hyoung-Hwa Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 956 days.

(21) Appl. No.: 12/740,535

(22) PCT Filed: Oct. 24, 2008

(86) PCT No.: PCT/KR2008/006316
§ 371 (c)(1),
(2), (4) Date: Dec. 29, 2010

(87) PCT Pub. No.: WO2009/057918
PCT Pub. Date: May 7, 2009

(65) Prior Publication Data
US 2011/0098853 A1    Apr. 28, 2011

(30) Foreign Application Priority Data

Oct. 30, 2007  (KR) .................. 10-2007-0109837
Jan. 2, 2008   (KR) .................. 10-2008-0000363

(51) Int. Cl.
*G05B 15/00*    (2006.01)

(52) U.S. Cl.
USPC ............................................. 700/253; 901/1

(58) Field of Classification Search
USPC ............... 700/245, 250, 253, 255, 258; 901/1
See application file for complete search history.

(56) References Cited

U.S. PATENT DOCUMENTS

| 7,792,606 B2 * | 9/2010 | Jager ............................. 700/245 |
| 2004/0111184 A1 * | 6/2004 | Chiappetta et al. ........... 700/245 |

(Continued)

FOREIGN PATENT DOCUMENTS

| JP | 5-46239 | 2/1993 |
| JP | 2004-147963 | 5/2004 |

(Continued)

OTHER PUBLICATIONS

International Search Report issued in PCT/KR2008/006316 dated Dec. 30, 2008.

(Continued)

*Primary Examiner* — Jason Holloway
(74) *Attorney, Agent, or Firm* — KED & Associates, LLP

(57) ABSTRACT

A method for controlling a robot cleaner includes: detecting a cleaning target space, setting a cleaning region within the detected cleaning space and cleaning the set cleaning region; if the set cleaning region is completely cleaned, moving to a not-yet-cleaned region adjacent to a cleaning completion spot of the cleaning region; and setting a new cleaning region in the not-yet-cleaned region and performing cleaning. Without repeating a cleaning region in the cleaning target space, the robot cleaner can extend its cleaning region, so the cleaning efficiency of the robot cleaner can be improved. Also, the robot cleaner can be smoothly enter a new cleaning target space or released therefrom. In particular, even when the entrance of the new cleaning target space is narrow, the robot cleaner can smoothly enter the new cleaning target space and gets out thereof.

17 Claims, 8 Drawing Sheets

(56) References Cited

U.S. PATENT DOCUMENTS

| | | | |
|---|---|---|---|
| 2004/0249511 A1* | 12/2004 | Jager | 700/248 |
| 2006/0237037 A1* | 10/2006 | Kim | 134/18 |
| 2007/0100500 A1* | 5/2007 | Abramson et al. | 700/245 |
| 2008/0133054 A1* | 6/2008 | Kim et al. | 700/245 |
| 2008/0249661 A1* | 10/2008 | Hong et al. | 700/252 |
| 2009/0149990 A1* | 6/2009 | Myeong et al. | 700/245 |
| 2009/0182464 A1* | 7/2009 | Myeong et al. | 701/25 |
| 2011/0137457 A1* | 6/2011 | Zini et al. | 700/245 |
| 2011/0202175 A1* | 8/2011 | Romanov et al. | 700/250 |

FOREIGN PATENT DOCUMENTS

| | | |
|---|---|---|
| KR | 10-1993-0019177 | 10/1993 |
| KR | 10-1994-0023434 | 11/1994 |
| KR | 10-0565227 | 3/2006 |

OTHER PUBLICATIONS

Korean Office Action issued in Application No. 10-2008-0000363 dated Dec. 27, 2013.

* cited by examiner

DETECTING APPARATUS OF ROBOT CLEANER AND CONTROLLING METHOD OF ROBOT CLEANER

TECHNICAL FIELD

The present invention relates to a robot cleaner and, more particularly, to a detecting apparatus of a robot cleaner and a method for controlling the robot cleaner.

BACKGROUND ART

A robot cleaner is an automatic cleaner that performs cleaning while moving on the floor according to an input program by using a charged battery as a driving source.

Unlike the conventional cleaning method that a user performs cleaning while directly dragging a cleaner, the robot cleaner can automatically perform cleaning by manipulating a remote controller or a simple operation button, reducing the burden of cleaning and saving a cleaning time.

The related art robot cleaner performs cleaning while randomly traveling in a cleaning target space. Namely, the related art robot cleaner performs cleaning while randomly traveling without a pattern in the cleaning target space.

Thus, the related art robot cleaner has a problem in that there is a high possibility that the robot cleaner repeatedly passes the same region, leading to a high possibility that the robot cleaner repeatedly performs the same region.

In addition, the robot cleaner cannot actively perform cleaning on a new region, degrading a cleaning efficiency of the robot cleaner.

Also, when the related art robot cleaner encounters an obstacle while running, it travels (runs), avoiding the obstacle. Thus, in terms of such operational characteristics, if an entrance to enter a new region is narrow, the robot cleaner cannot pass such narrow entrance to reach the new region but may remain at a current region.

In such a situation, the user should directly move the robot cleaner to the new region for his inconvenience, or cleaning cannot be properly performed by the robot cleaner.

Even when the robot cleaner completes cleaning on the new region, the robot cleaner may not be released from the new region (may not move out of the new region).

DISCLOSURE OF THE INVENTION

Therefore, an object of the present invention is to provide a robot cleaner having a structure for effectively cleaning a cleaning target space, and its control method.

Another object of the present invention is to provide a detecting apparatus of a robot cleaner capable of allowing the robot cleaner to detect a new region and smoothly move thereto, and a method for controlling the robot cleaner.

To achieve these and other advantages and in accordance with the purpose of the present invention, as embodied and broadly described herein, there is provided a robot cleaner including: a detecting unit for detecting a cleaning region or a not-yet-cleaned region in a cleaning target region; and a controller for setting the detected cleaning region and a new cleaning region in the detected not-yet-cleaned region and issuing a cleaning command.

When cleaning in the detected cleaning region is completed and a not-yet-cleaned region adjacent to the cleaning completion point (spot) of the cleaning region is detected, the controller may control the robot cleaner to move to the detected not-yet-cleaned region to clean it.

When an accumulated movement distance of the robot cleaner traveling (running, operating) in the cleaning target space reaches a pre-set certain movement distance, the controller may correct the location of the robot cleaner.

The detecting unit may detect the surface of a wall or a corner when the robot cleaner travels.

When at least one of a first condition in which the number of non-detections of the surface of the wall is accumulated twice and a second condition in which the number of detections of the corner is accumulated twice is met, the controller may recognize a corresponding travel region as a cleaning target space.

When the number of non-detections of the surface of the wall and the number of detections of the corner occur successively, it is considered that the first and second conditions are met.

The robot cleaner may include a storage unit for storing the number of non-detections of the surface of the wall and the number of detections of the corner.

The controller executes a cleaning mode of the robot cleaner with respect to a region recognized as a cleaning target space.

To achieve the above objects, there is also provided a method for controlling a robot cleaner including: detecting a cleaning target space, setting a cleaning region within the detected cleaning space and cleaning the set cleaning region; when the set cleaning region is completely cleaned, moving to a not-yet-cleaned region adjacent to a cleaning completion spot of the cleaning region; and setting a new cleaning region in the not-yet-cleaned region and performing cleaning.

The moving to the not-yet-cleaned region may include: when cleaning of the set cleaning region is completed, determining whether or not there is a not-yet-cleaned region adjacent to the cleaning completion spot of the certain cleaning region; if it is determined that there is a not-yet-cleaned region, setting the corresponding not-yet-cleaned region as a new cleaning region; and moving to the new cleaning region.

The method may further include: correcting the location of the robot cleaner when an accumulated movement distance of the robot cleaner within the cleaning target space reaches a pre-set reference distance.

The location of the robot cleaner is corrected based on a docking station.

The cleaning region may be set by repeatedly performing a travel pattern that the robot cleaner travels a certain distance and then changes its direction in the cleaning target space.

The cleaning region may be set based on a middle point of a certain travel distance calculated after the robot cleaner travels the certain distance in the cleaning target space.

The detecting of the cleaning target space may include: detecting an obstacle by the robot cleaner; and recognizing a corresponding region as a cleaning target space based on the obstacle detection result.

In detecting the obstacle, the robot cleaner may detect the surface of a wall forming the cleaning target space and a corner in the space.

The recognizing of the cleaning target space may include: determining whether or not at least one of a first condition that the accumulated number of non-detections of the surface of the wall by the robot cleaner while traveling is two times, and a second condition that the accumulated number of detections of the corner by the robot cleaner while traveling is two times, is met; and when at least one of the first and second conditions is met, recognizing a corresponding region as a cleaning target space.

The recognizing of the cleaning target space may further include: storing the number of non-detections of the surface of the wall and the number of detections of the corner as recognized by a detecting unit in a storage unit.

In determining the conditions, it is determined whether or not at least one of the first and second conditions is met based on the value stored in the storage unit.

In determining the conditions, if the number of non-detections of the surface of the wall and the number of detections of the corner occur successively, it is determined that the first and second conditions are met, respectively.

In recognizing the cleaning target space, the robot cleaner executes a cleaning mode in the region recognized as the cleaning target space.

According to the robot cleaner and its control method according to the present invention, a certain cleaning region is set in a cleaning target space, cleaning is performed on the set cleaning region, it is determined whether or not there is a not-yet-cleaned region adjacent to a cleaning completion spot, a corresponding not-yet-cleaned region, if any, is set as a new cleaning region, cleaning is performed on the set cleaning region, and these cleaning operation is repeatedly performed to completely clean any remaining cleaning region in the cleaning target space. Thus, the robot cleaner can expand its cleaning region without having any overlapped cleaning region in the cleaning target space, so the cleaning efficiency of the robot cleaner with respect to the cleaning target space can be improved.

In addition, because the robot cleaner moves to a next cleaning region from a cleaning completion spot of a certain cleaning region in the cleaning target space, a movement path of the robot cleaner can be shortened, and thus, the cleaning efficiency of the robot cleaner can be improved.

Also, because the robot cleaner performs cleaning such that it gradually expands its cleaning region in the cleaning target space, an erroneous recognition of an overall cleaning target space due to a slip of the wheels of the robot cleaner that may occur when the robot cleaner recognizes a cleaning target space while moving overall in the cleaning target space, divides the cleaning target space into virtual regions, and cleans the divided regions can be prevented, and thus, the cleaning efficiency of the robot cleaner can be improved.

Moreover, because whether or not the accumulated movement distance of the robot cleaner reaches a pre-set movement distance is determined and the location of the robot cleaner is corrected based on a docking station, the location of the robot cleaner in the cleaning target space can be precise, and thus, cleaning can be accurately performed on the cleaning target space.

Also, if it is determined that cleaning regions do not overlap based on the distances between a middle point of one cleaning region and that of another cleaning region, the controller sets a new cleaning region. Thus, the respective cleaning regions can be set such that they do not overlap in the cleaning target space, so the cleaning efficiency of the robot cleaner can be improved.

In addition, if at least one of the first condition in which the number of non-detections of the surface of the wall by the detecting unit is accumulated two times and the second condition in which the number of detections of the corner by the detecting unit is accumulated two times, while the robot cleaner is traveling is met, a corresponding region is recognized as the cleaning target space and the robot cleaner can enter the cleaning target space, perform cleaning, and move out of the cleaning target space. Thus, the robot cleaner can easily and smoothly enter and get out of a new cleaning target space.

In particular, even if an entrance of a new cleaning target space is narrow, the robot cleaner can easily enter and get out of the new cleaning space in such a manner as described above.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODES FOR CARRYING OUT THE PREFERRED EMBODIMENTS

A robot cleaner and its control method according to exemplary embodiments of the present invention will now be described with reference to the accompanying drawings.

Figure 1:
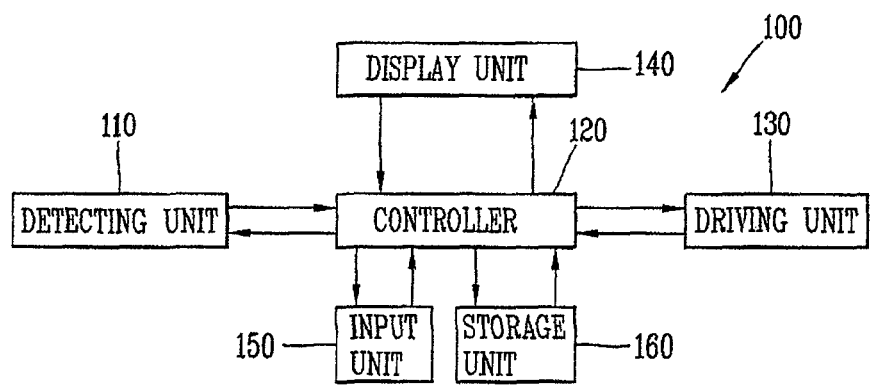
FIG. 1 is a schematic block diagram showing some elements of a robot cleaner according to a first embodiment of the present invention.

FIG. 1 is a schematic block diagram showing some elements of a robot cleaner according to a first embodiment of the present invention.

Figure 2:
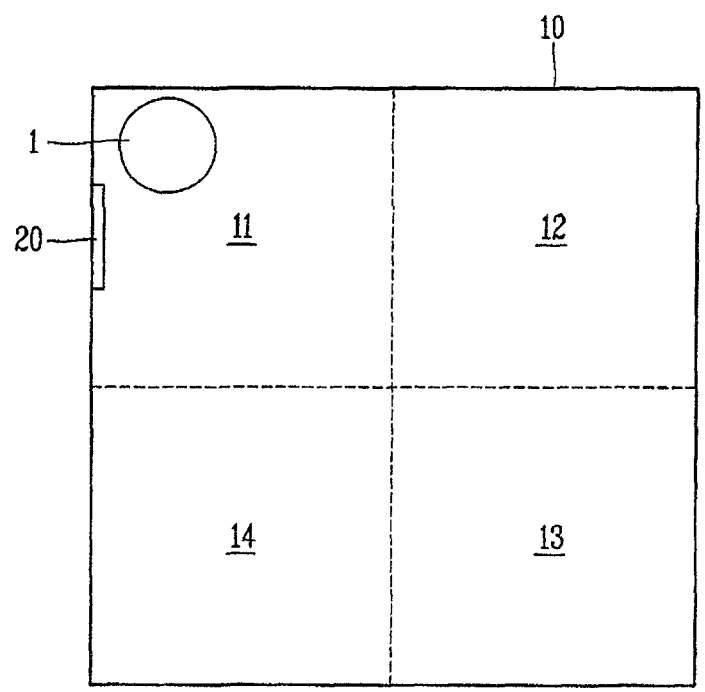
FIG. 2 is a view schematically showing a robot cleaner located at one corner in a cleaning target space according to the first embodiment of the present invention.

With reference to FIG. 1, a robot cleaner (1 in FIG. 2) according to the first embodiment of the present invention performs cleaning on a cleaning target space (10 in FIG. 2)

and may include a detecting unit 110, a controller 120, a driving unit 130, a display unit 140, an input unit 150, and a storage unit 160.

The detecting unit 110 can detect an obstacle, the surface of a wall, or the like, positioned in the cleaning target space 10, and may include an ultrasonic sensor or the like.

The detecting unit 110 may include a location-based sensor to recognize the location of the robot cleaner 1 in the cleaning target space 10. An inertial sensor may be applied as the location-based sensor.

The controller 120 may control a traveling or cleaning pattern of the robot cleaner 1. In this embodiment, the controller 120 may set a certain cleaning region in the cleaning target space 10, determine whether or not there is a not-yet-cleaned region adjacent to the certain cleaning region, and set a corresponding not-yet-cleaned region as a new cleaning region.

When cleaning on the certain cleaning region of the cleaning target space 10 detected by the detecting unit 110 is completed, the controller 120 may detect whether or not there is a not-yet-cleaned region adjacent to a cleaning completion spot of the cleaning region and issue a command for moving to a corresponding not-yet-cleaned region and a command for cleaning the not-yet-cleaned region.

If an accumulated movement distance of the robot cleaner 1 that travels in the cleaning target space 10 reaches a pre-set certain movement distance, the controller 120 may correct the location of the robot cleaner 1. This operation of the controller 120 will be described later.

The driving unit 130 drives each element of the robot cleaner 1 such as a driving wheel (not shown) or the like according to a signal transferred from the controller 120.

Namely, the robot cleaner 1 can drive an agitator to clean the cleaning target space while moving on its driving wheels driven by a driving motor, so the driving unit 130 drives the driving motor and the agitator according to a command of the controller 120.

The display unit 140 displays various information of the robot cleaner, namely, an operation mode, a current state, or the like, of the robot cleaner 1, transferred from the controller 120.

The input unit 150 inputs various commands, information, or the like, with respect to the robot cleaner 1 by a user. Information inputted via the input unit 150 may be transferred to and processed by the controller 120.

The storage unit 160 stores various information processed by the controller. Information stored in the storage unit 160 may include information about regions divided by the robot cleaner 1 in the cleaning target space 10, information about an accumulated movement distance of the robot cleaner 1, or the like.

Figure 3:
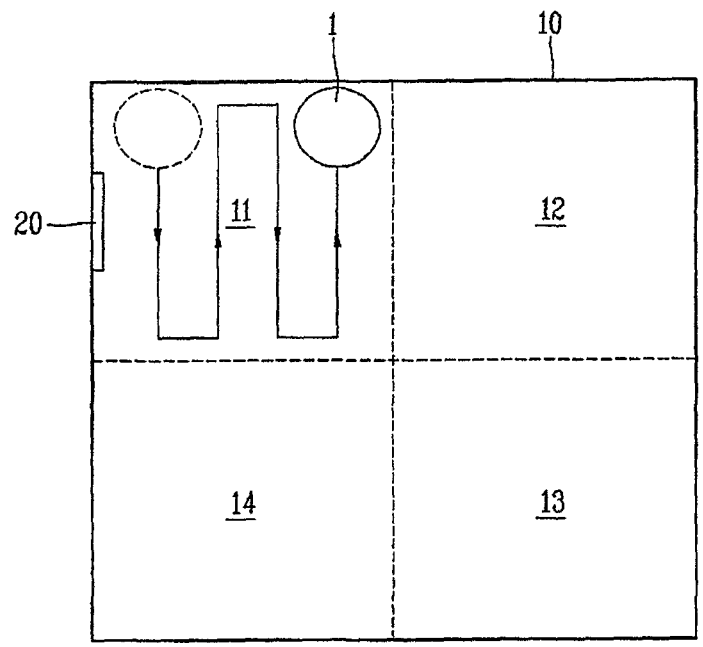
FIG. 3 is a view showing the robot cleaner as shown in FIG. 2 that performs cleaning one cleaning region of the cleaning target space.
Figure 4:
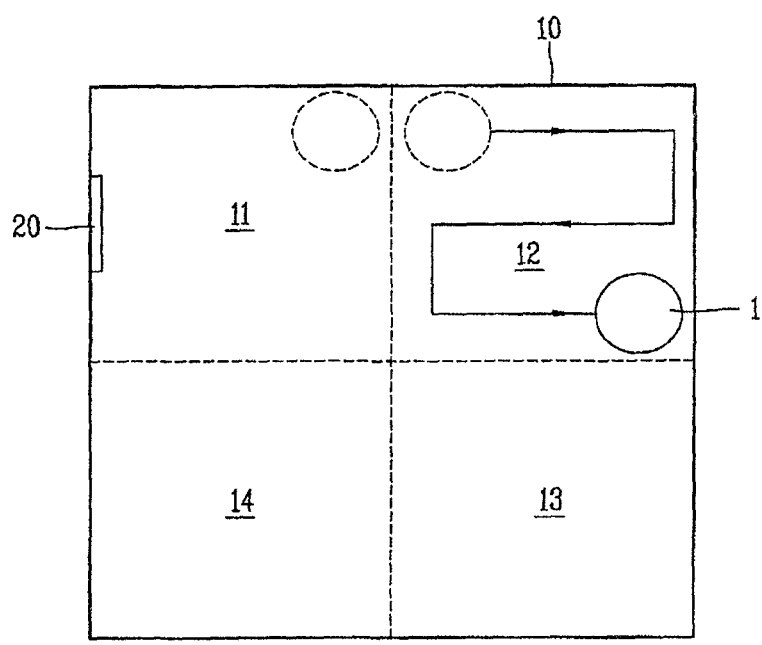
FIG. 4 is a view showing the robot cleaner as shown in FIG. 3 that performs cleaning another cleaning region of the cleaning target space.
Figure 5:
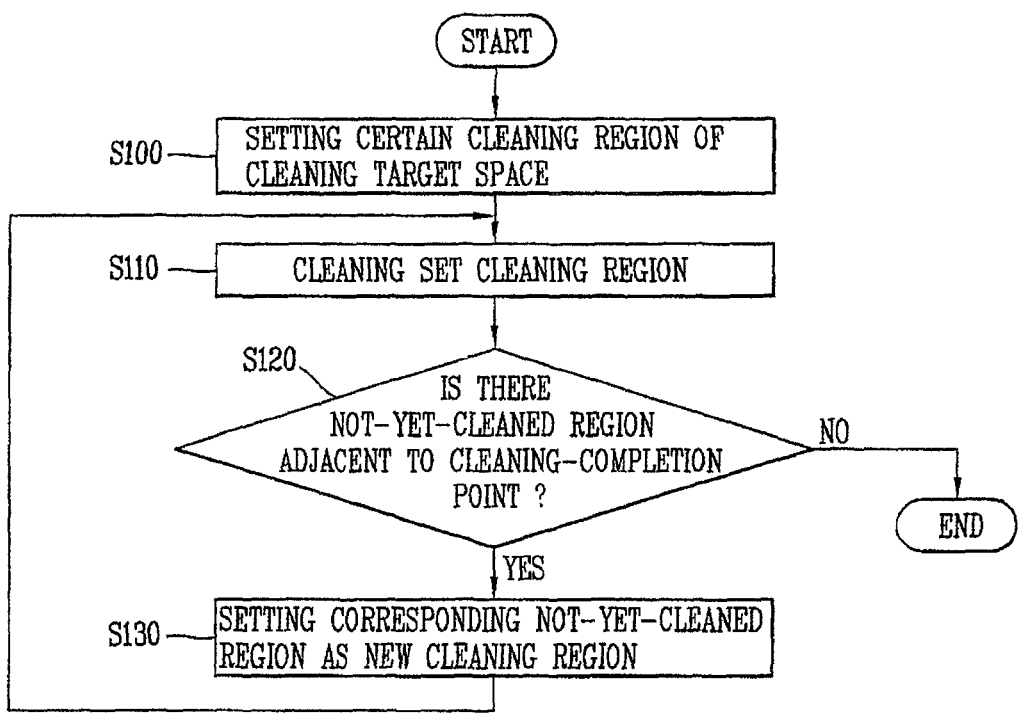
FIG. 5 is a flow chart illustrating the process of a method for controlling the robot cleaner according to the first embodiment of the present invention.

FIG. 2 is a view schematically showing a robot cleaner located at one corner in a cleaning target space according to the first embodiment of the present invention, FIG. 3 is a view showing the robot cleaner as shown in FIG. 2 that performs cleaning one cleaning region of the cleaning target space, FIG. 4 is a view showing the robot cleaner as shown in FIG. 3 that performs cleaning another cleaning region of the cleaning target space, and FIG. 5 is a flow chart illustrating the process of a method for controlling the robot cleaner according to the first embodiment of the present invention.

The robot cleaner and its control method according to the first embodiment of the present invention will now be described with reference to FIGS. 2 to 5.

Reference numerals 11 to 14 in FIGS. 2 to 4 denote regions obtained by arbitrarily dividing the cleaning target space 10, which may be defined as first to fourth cleaning regions.

Reference numeral 20 denotes a docking station where a charging terminal for recharging the robot cleaner 1 is installed.

As shown in FIG. 2, the robot cleaner 1 located at one corner in the cleaning target space 10 travels in the cleaning target space 10 and sets a certain cleaning region, namely, the first cleaning region 11 (S100).

In detail, the robot cleaner 1 moves by a pre-set certain distance along the surface of a wall of the cleaning target space 10 from the corner in the cleaning target space 10 where the robot cleaner 1 is initially located.

When the robot cleaner 1 moves by the pre-set movement distance, the robot cleaner 1, it changes its direction and then moves again by the pre-set movement distance. The robot cleaner 1 repeats the travel pattern of traveling by the certain distance and changing its direction to form a polygonal space, namely, the square space as shown in FIG. 1, to set the square space as the first cleaning region 11.

Setting the first cleaning region 11, the robot cleaner 1 is re-located at one corner where it was initially located.

The method of setting the first cleaning region 11 can be applicable to the second to fourth cleaning regions 12 to 14 in the same manner in this embodiment.

After setting the first cleaning region 11 while performing such processes, the robot cleaner 1 starts from the initial location to clean the first cleaning region 11.

A cleaning pattern with respect to the first cleaning region 11 may include various other patterns such as a spiral pattern or the like, besides a zigzag pattern as shown in FIG. 3, and such a cleaning pattern does not limit the technical idea of the present invention.

When completing cleaning on the first cleaning region 11, the robot cleaner 1 reaches a cleaning completion spot in the first cleaning region 11 as shown in FIG. 4.

When the robot cleaner 1 reaches the cleaning completion spot in the first cleaning region 11, the controller checks whether there is a not-yet-cleaned region adjacent to the first cleaning region 11 which has been completely cleaned in the cleaning target space 10 by means of the detecting unit 110 (S120).

Here, in determining whether or not there is a not-yet-cleaned region adjacent to the cleaning-completed first cleaning region 11, it is determined whether or not there is a not-yet-cleaned region adjacent to the cleaning completion spot, a point where the robot cleaner 1 is located within the first cleaning region 11, after the first cleaning region 11 is completely cleaned.

If it is determined that there is a not-yet-cleaned region, namely, a second cleaning region 12, adjacent to the first cleaning region 11 which has been completely cleaned in the cleaning target space 10 through step S120, the not-yet-cleaned region, namely, the second cleaning region 12, is set as a new cleaning region (S130).

A cleaning region setting method for the second cleaning region 12 is the same as that for the first cleaning region 11, so its description will be omitted.

The robot cleaner 1 moves to the set second cleaning region 12 and performs cleaning thereon as shown in FIG. 4 (S110).

Repeatedly performing the step (S110) of cleaning the set cleaning region, the step (S120) of determining whether or not there is a not-yet-cleaned region adjacent to the cleaning completion spot, and the step (S130) of setting a corresponding not-yet-cleaned region as a new cleaning region, the robot cleaner 1 performs setting and cleaning the third and fourth cleaning regions 13 and 14.

Through such processes, the robot cleaner 1 completes cleaning on the cleaning target space 10.

In the method for controlling the robot cleaner 1 according to the first embodiment of the present invention, a certain cleaning region is set in the cleaning target space 10 (S110), it is determined whether or not there is a not-yet-cleaned region adjacent to the cleaning completion spot (S120), a corresponding not-yet-cleaned region is set as a new cleaning region (S130), and cleaning is performed on the set cleaning region (S110), and this processes are repeatedly performed to clean any remaining cleaning region in the cleaning target space 10. Thus, the robot cleaner 1 can expand the cleaning region such that cleaning regions do not overlap with each other in the cleaning target space 10, and thus the cleaning efficiency of the robot cleaner 1 with respect to the cleaning target space 10 can be improved.

In addition, in the method for controlling the robot cleaner 1 according to the first embodiment of the present invention, because the robot cleaner moves to a next cleaning region from a cleaning completion spot of a certain cleaning region of the In the method for controlling the robot cleaner 1 according to the first embodiment of the present invention, the movement path of the robot cleaner 1 can be shortened, and thus the cleaning efficiency of the robot cleaner 1 with respect to the cleaning target space 10 can be improved.

Also, in the method for controlling the robot cleaner 1 according to the first embodiment of the present invention, because the robot cleaner 1 performs cleaning such that the cleaning region is gradually expanded in the cleaning target space 10, an erroneous recognition of an overall cleaning target space due to a slip of the wheels of the robot cleaner that may occur when the robot cleaner recognizes the cleaning target space 10 while moving overall in a cleaning target space, divides the cleaning target space into virtual regions, and cleans the divided regions can be prevented, and thus, the cleaning efficiency of the robot cleaner 1 can be improved.

Other embodiments of the present invention will now be described. In describing other embodiments, the repeated content as that of the first embodiment of the present invention will be omitted.

Figure 6:
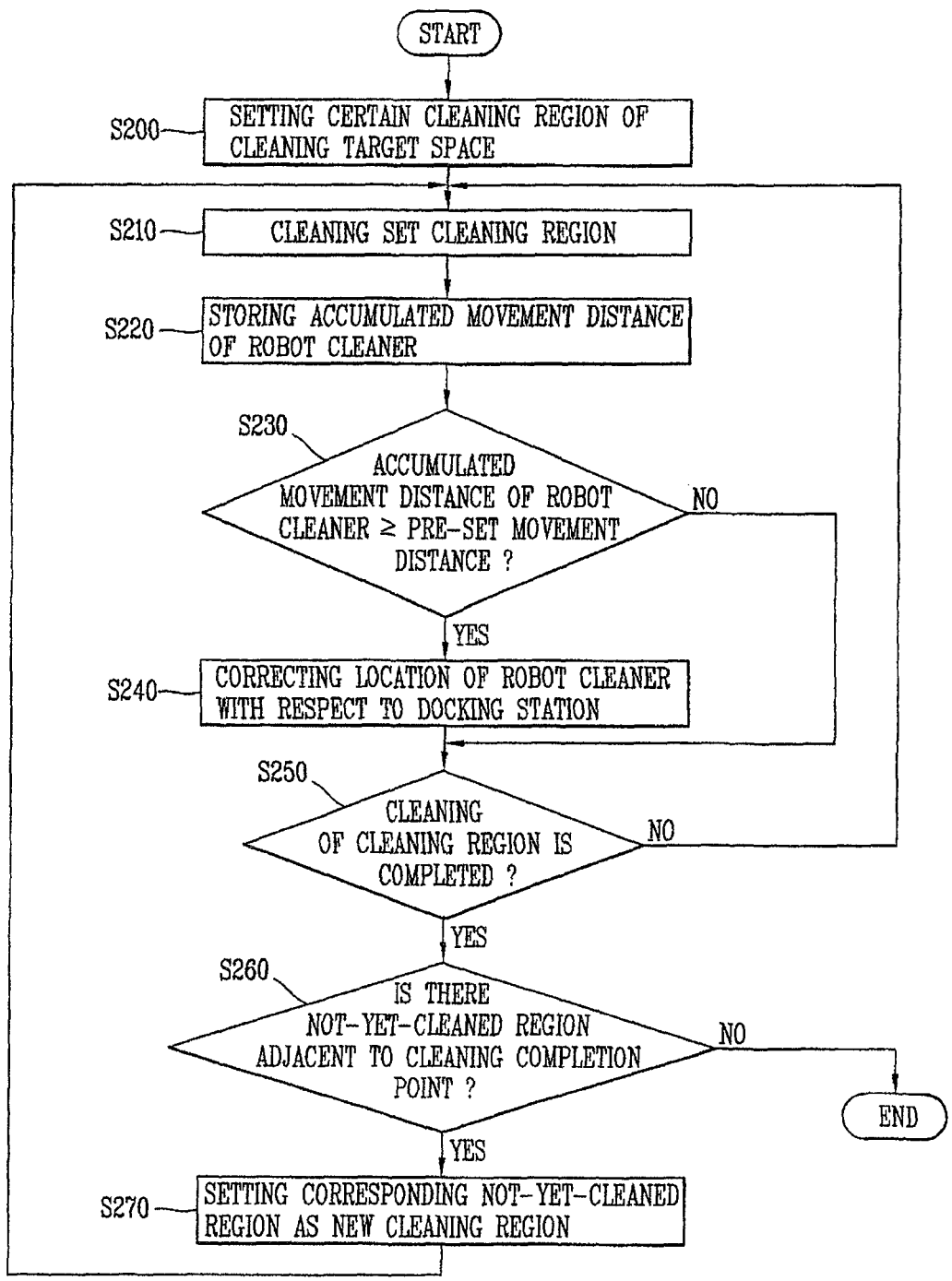
FIG. 6 is a flow chart illustrating the process of a method for controlling the robot cleaner according to a second embodiment of the present invention.

FIG. 6 is a flow chart illustrating the process of a method for controlling the robot cleaner according to a second embodiment of the present invention.

A method for controlling the robot cleaner 1 according to the second embodiment of the present invention will now be described with reference to FIG. 6.

First, the robot cleaner 1 sets a certain cleaning region, namely, the first cleaning region 11, of the cleaning target space 10 (S200), and cleans the set first cleaning region 11 (S210).

At this time, while the robot cleaner 1 performs cleaning on the first cleaning region 11, the movement distance of the robot cleaner 1 is accumulated and stored in the storage unit 160.

Thereafter, it is checked whether or not the accumulated movement distance of the robot cleaner 1 reaches a pre-set movement distance (S230).

If the accumulated movement distance of the robot cleaner 1 reaches the pre-set movement distance, the location of the robot cleaner 1 is corrected based on the docking station 20 (S240).

Here, the correction of the location makes the docking station 20 generate ultrasonic waves, and the detecting unit 110 of the robot cleaner 1 detects the ultrasonic waves to correct the distance to the docking station 20 from the robot cleaner 1, a posture of the robot cleaner, or the like. Besides this method, various other methods can be applicable.

The docking station 20 is proposed as a reference point of the location correction, but it is an exemplary one and any other reference point can be applicable.

When the location correction is completed (S240) or if it is determined that the accumulated movement distance of the robot cleaner 1 has not reached the pre-set movement distance, it is checked whether cleaning has been completed on the first cleaning region 11 (S250). If cleaning has not been completed yet, cleaning continues (S210), and if cleaning has been completed, it is determined whether or not there is any not-yet-cleaned region adjacent to the cleaning completion spot (S260).

If it is determined that there is a not-yet-cleaned region, namely, the second cleaning region 12, adjacent to the cleaning completion spot, the second cleaning region 12 is set as a new cleaning region (S270) and cleaned (S210).

The processes are repeatedly performed in the same manner on the third and fourth cleaning regions 13 and 14. Through such processes, the cleaning may be completed on the cleaning target space 10.

In the method for controlling the robot cleaner 1 according to this embodiment of the present invention, because it is determined whether or not the accumulated movement distance of robot cleaner 1 has reached the pre-set movement distance and then the location of the robot cleaner 1 is corrected based on the docking station 20, the location of the robot cleaner 1 in the cleaning target space 10 can be precise, and thus, cleaning can be accurately performed on the cleaning target space 10.

Figure 7:
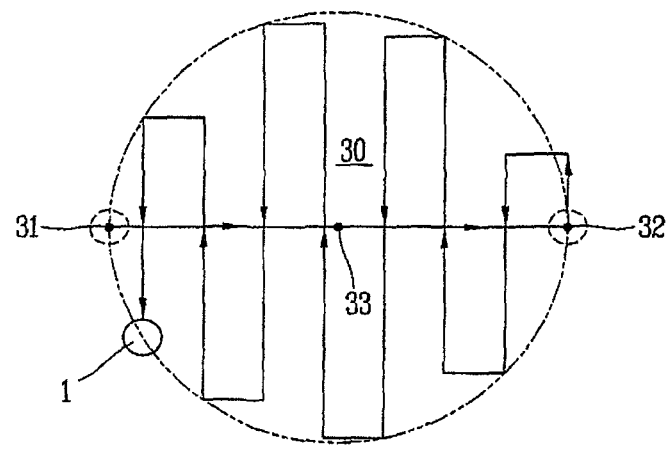
FIG. 7 is a view showing the robot cleaner that performs cleaning on one region of the cleaning target space according to a third embodiment of the present invention.
Figure 8:
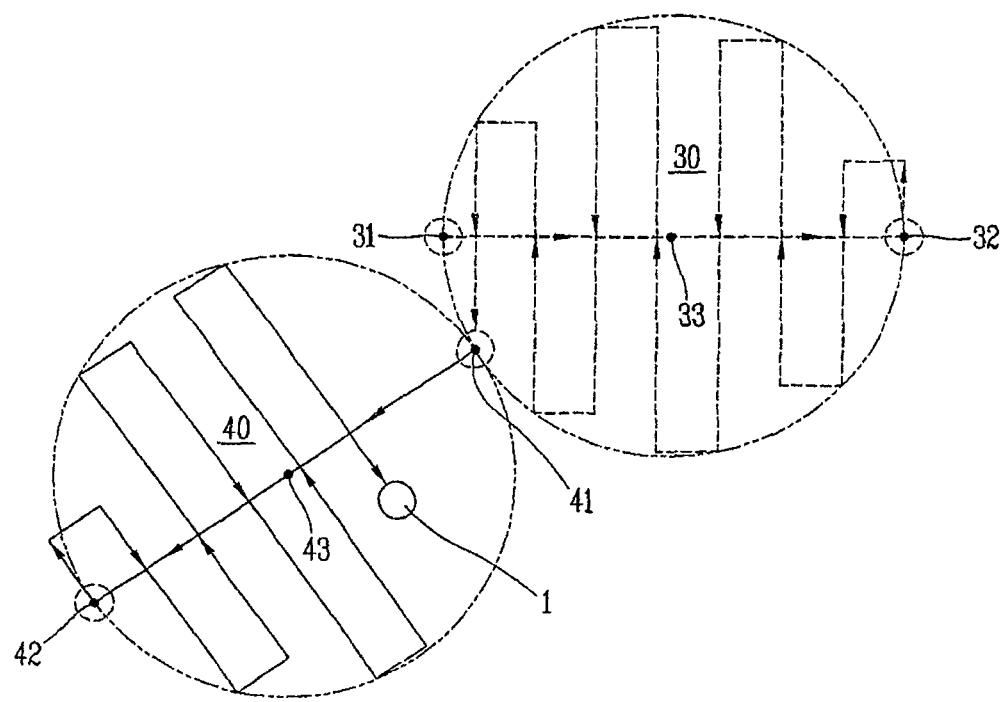
FIG. 8 is a view showing the robot cleaner of FIG. 7 that performs cleaning on another region of the cleaning target space.
Figure 9:
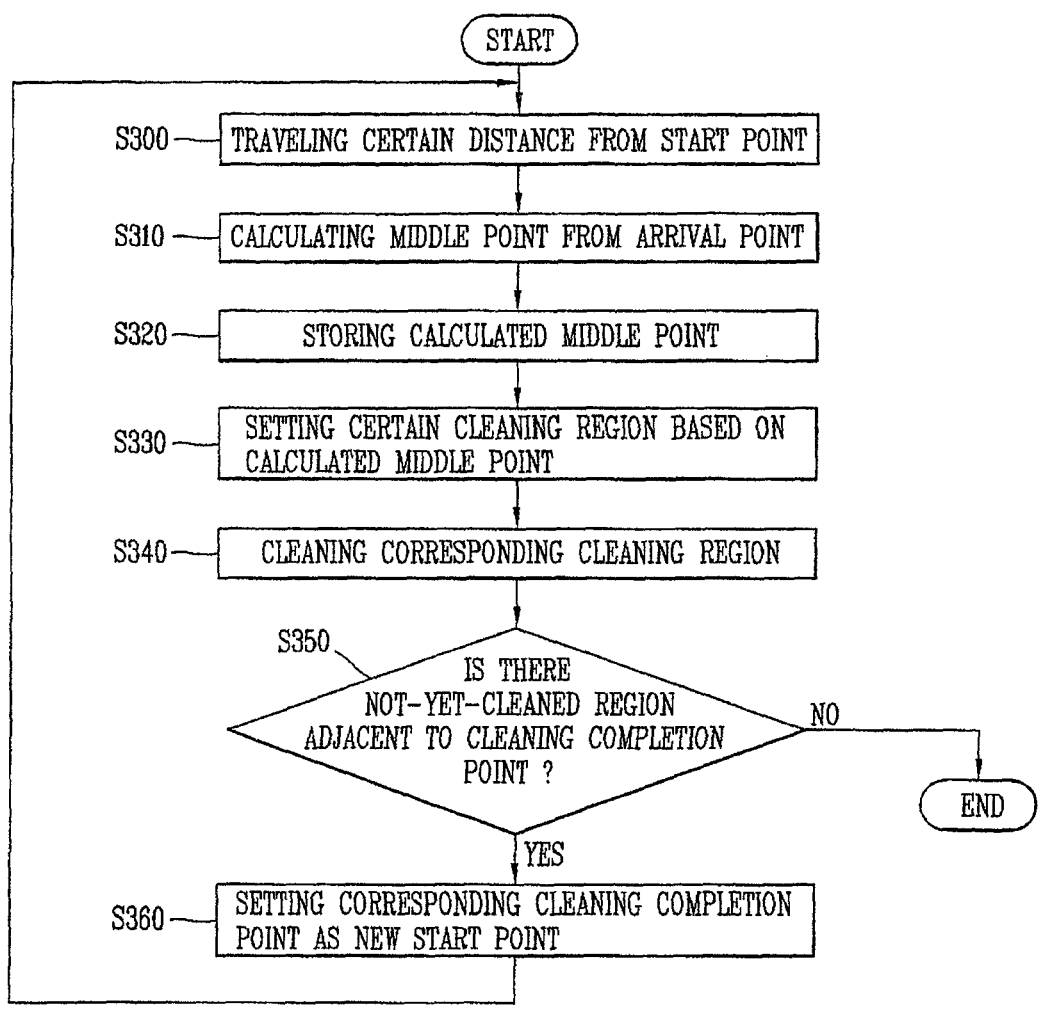
FIG. 9 is a flow chart illustrating the process of a method for controlling the robot cleaner according to a third embodiment of the present invention.

FIG. 7 is a view showing the robot cleaner that performs cleaning on one region of the cleaning target space according to a third embodiment of the present invention, FIG. 8 is a view showing the robot cleaner of FIG. 7 that performs cleaning on another region of the cleaning target space, and FIG. 9 is a flow chart illustrating the process of a method for controlling the robot cleaner according to a third embodiment of the present invention.

The robot cleaner and its control method according to the third embodiment of the present invention will now be described with reference to FIGS. 7 to 9.

Reference numerals 30 and 40 shown in the FIGS. 7 and 8 are defined as the first and second cleaning regions 30 and 40, respectively.

Reference numerals 31 and 41 are start points of the robot cleaner 1 in the first and second cleaning regions 30 and 40, 32 and 42 are arrival points of the robot cleaner 1 in the first and second cleaning regions 30 and 40, and 33 and 43 are middle points of the robot cleaner 1 in the first and second cleaning regions 30 and 40, respectively.

First, the robot cleaner 1 starts from the start point 31 of the first cleaning region 30 and travels by a certain distance up to the arrival point 32 of the first cleaning region 30 (S300).

This process is performed by allowing the robot cleaner 1 to travel by the pre-set certain distance from the start point 31. An end point of the pre-set certain distance is the arrival point 32.

When the robot cleaner 1 reaches the arrival point 32, the middle point 33 is calculated at the arrival point 32 (S310). Here, the middle point 33 comes in the middle of the half of the distance along which the robot cleaner 1 has traveled, namely, it is a middle point between the start point 31 and the arrival point 32, within the first cleaning region 30

The calculated middle point 33 is stored in the storage unit 160 (S320).

And then, a certain cleaning region, namely, the first cleaning region 30, is set based on the middle point 33 (S330).

Here, a circular region having a radius corresponding to the distance from the middle point 33 to the start point 31 or the arrival point 32 based on the middle point 33 is formed, which is set as the first cleaning region 30.

Thereafter, as shown in FIG. 7, the robot cleaner 1 cleans the first cleaning region 30 (S340) while drawing zigzag patterns in the direction in which the robot cleaner moves backward from the arrival point 32 to the start point 31 (S340).

Here, the controller continuously recognizes the difference of the distance between the middle point 33 and a current location of the robot cleaner 1 to prevent the robot cleaner 1 from being released from the first cleaning region 30. In this manner, even if there is an obstacle at the first cleaning region 30, the robot cleaner 1 can effectively perform cleaning without moving out of the first cleaning region 30.

And then, the controller 120 determines whether there is a not-yet-cleaned region, namely, the second cleaning region 40, adjacent to the cleaning completion point of the first cleaning region 30.

If it is determined that there is a not-yet-cleaned region adjacent to the cleaning completion point of the first cleaning region 30, the steps S300 to S340 are repeatedly performed.

In detail, the robot cleaner 1 starts from the start point 41 of the second cleaning region 40 and travels a certain distance up to the arrival point 42 of the second cleaning region 40 (S300).

When the robot cleaner 1 reaches the arrival point 42, the middle point 43 from the arrival point 42 is calculated (S310) and stored in the storage unit 160 (S320).

And then, a certain cleaning region namely, the second cleaning region 40 herein, is set based on the middle point 43 (S330).

Here, if it is determined that the first cleaning region 30 and the second cleaning region to be newly set do not overlap with each other based on the distance between the middle point of the second cleaning region 40 and middle points of other cleaning regions, namely, the middle point 33 of the first cleaning region 30, the controller 120 sets the second cleaning region 40. Accordingly, the respective cleaning regions 30 and 40 are set such that they do not overlap with each other in the cleaning target space 10, so the cleaning efficiency of the robot cleaner 1 can be improved.

Thereafter, as shown in FIG. 8, the robot cleaner 1 cleans the second cleaning region while drawing zigzag patterns in the direction in which the robot cleaner 1 moves back toward the start point 41 from the arrival point 42.

While repeating the processes, the robot cleaner 1 gradually enlarges the cleaning region of the cleaning target space 10 to clean the cleaning region.

In the cleaning process, the controller determines the distance between the middle points 33 and 43 of the respective cleaning regions 30 and 40 stored in the storage unit 160 and a current location of the robot cleaner 1. If the distance difference is smaller than a certain value, for example, the radius of the cleaning regions 30 and 40, the controller 120 determines that the robot cleaner 1 is located in a cleaning-completed region.

Then, the controller controls the robot cleaner 1 to pass the corresponding cleaning-completed region without performing cleaning thereon. Thus, the robot cleaner 1 cannot repeatedly clean the same region.

Figure 10:
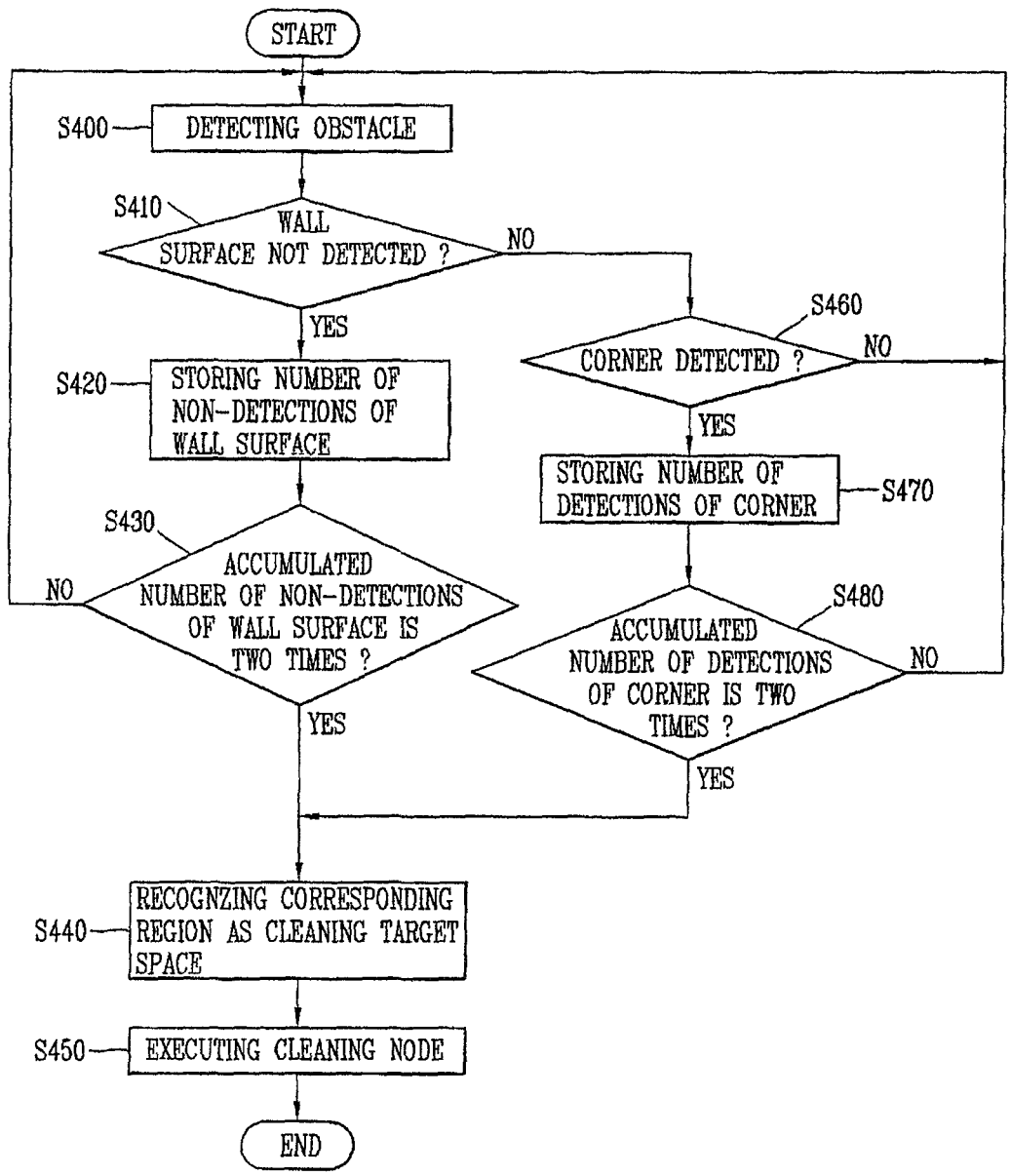
FIG. 10 is a flow chart illustrating the process of a method for controlling the robot cleaner according to a fourth embodiment of the present invention.

FIG. 10 is a flow chart illustrating the process of a method for controlling the robot cleaner according to a fourth embodiment of the present invention.

The method for controlling the robot cleaner 1 according to the fourth embodiment of the present invention will now be described with reference to FIGS. 1 and 10.

The robot cleaner 1 including the detecting unit 110 can smoothly move to a new region to be subjected for cleaning through the entrance to the new region.

In detail, the detecting unit 110 can detect obstacles, i.e., a projection, an article of furniture, furnishings, the surface of a wall, a corner, or the like, in relation to a travel path. Information about the obstacles detected by the detecting unit 110 is transferred to the controller 120.

The controller 120 determines whether to recognize a corresponding region in which the robot cleaner 1 travels as a cleaning target space based on the information transferred from the detecting unit 110.

In detail, if at least one of a first condition that the number of non-detections of the surface of the wall among the obstacles by the detecting unit 110 is accumulated two times and a second condition that the number of detections of the corner among the obstacles by the detecting unit 110 is accumulated two times is met, the controller 120 recognizes the corresponding region as a cleaning target space.

Here, when the number of non-detections of the surface of the wall and the number of detections of the corner occur successively, the controller 120 determines that the first and second conditions are met.

In addition, the controller 120 may executes the cleaning mode of the robot cleaner 1 on the region recognized as the cleaning target space.

Such determining by the controller 120 may be described later with reference to FIGS. 10 and 12.

The storage unit 160 stores the number of non-detections of the surface of the wall and the number of detections of the corner.

The driving unit 130 drives each element of the robot cleaner 1 such that whether or not the robot cleaner 1 travels and a travel direction and execution of the cleaning mode of the robot cleaner may follow the command of the controller 120.

The display unit 140 displays information such as a travel state of the robot cleaner 1 according to the determination result of the controller 120.

Figure 11:
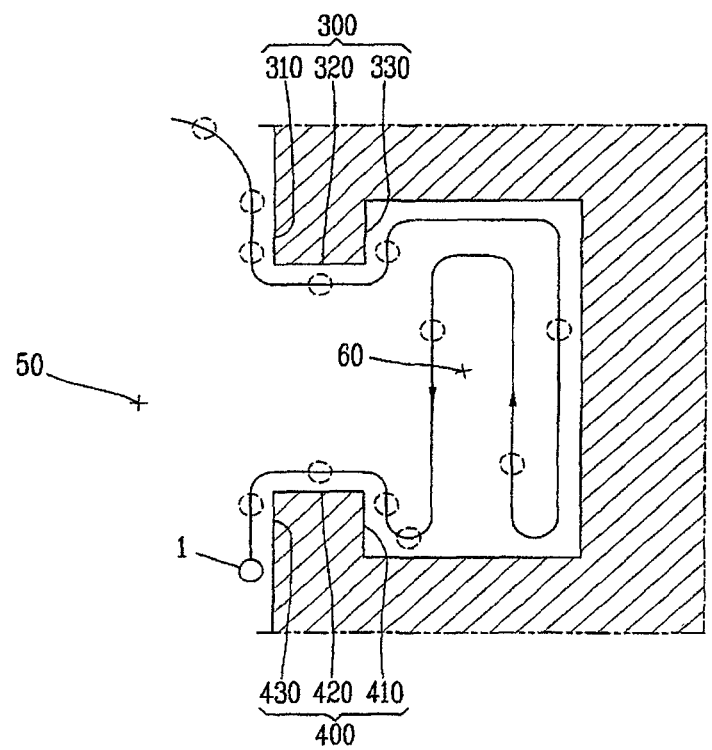
FIG. 11 is a view showing a travel path of the robot cleaner under a first condition according to the fourth embodiment of the present invention.
Figure 12:
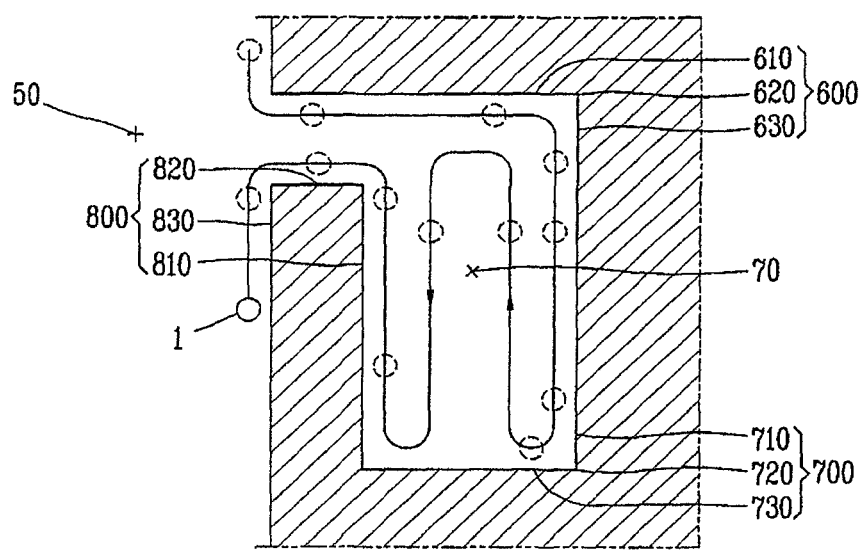
FIG. 12 is a view showing a travel path of the robot cleaner under a second condition according to the fourth embodiment of the present invention.

FIG. 10 is a flow chart illustrating the process of a method for controlling the robot cleaner according to a fourth embodiment of the present invention, FIG. 11 is a view showing a travel path of the robot cleaner under a first condition according to the fourth embodiment of the present invention, and FIG. 12 is a view showing a travel path of the robot cleaner under a second condition according to the fourth embodiment of the present invention.

The method for controlling the robot cleaner according to the fourth embodiment of the present invention will now be described with reference to FIGS. 10 to 12.

First, the travel path of the robot cleaner 1 under the first condition will now be described with reference to FIGS. 10 and 11.

Reference numeral 50 in FIG. 11 denotes a first travel region in which the robot cleaner 11 is currently traveling, and 60 denotes a second travel region which the robot cleaner 1 is to newly enter. Reference numeral 300 denotes a first wall body, and 310 to 330 denote first to third wall surfaces of the first wall body 300. Reference numeral 400 denotes a second wall body, and 410 to 430 denote first to third wall surfaces of the second wall body 400.

When the robot cleaner 1 having the detecting unit 100 travels, the detecting unit 110 detects an obstacle on the travel path of the robot cleaner 1 (S400).

Information about the obstacle detected by the detecting unit 110 is transferred to the controller 120. Then, the controller 120 determines whether the obstacle is a wall surface.

If the obstacle is a wall surface, the controller transfers a signal to the driving unit 130 so that the robot cleaner 1 can travel along the wall surface.

Through such processes, the robot cleaner 1 travels along the first wall surface 310 of the first wall body 300.

When the robot cleaner 1 which has traveled along the first wall surface 310 reaches the end of the first wall surface 310, the detecting unit 110 determines that the first wall surface 310 is not detected (S410) and transfers the non-detection information to the controller 120.

Upon receiving the information that the first wall surface 310 is not detected, the controller 120 transfers the information to the storage unit 160 to store it (S420). The controller 120 may display the non-detection information of the first wall surface 310 on the display unit 140.

In addition, the controller 120 transfers a signal to the driving unit 130 to make the robot cleaner 1 travel along the second wall surface 320.

When the robot cleaner 1, which has traveled along the second wall surface 320, reaches the end of the second wall surface 320, the detecting unit 110 determines that the second wall surface 320 is not detected (S410) and transfers the non-detection information to the controller 120.

Upon receiving the non-detection information, the controller transfers it to the storage unit 160 to store it (S420).

The controller 120 determines whether or not the information stored in the storage unit 160 meets the first condition that the number of non-detections of the wall surfaces 310 and 320 by the detecting unit 110 is accumulated two times (S430).

If the first condition is met, the controller 120 recognizes the second travel region 60 in which the robot cleaner 1 is traveling as a new cleaning target space (S440) and makes the robot cleaner 1 enter the second travel region 60 to execute the cleaning mode of the robot cleaner 1 on the second travel region 60 (S450).

FIG. 11 shows the case that the robot cleaner 1 performs cleaning while traveling zigzags in the corresponding region 60, but it is an exemplary case and various other travel patterns may be proposed.

After cleaning is completed on the second travel region 60, the robot cleaner 1 travels along the first wall surface 410 of the second wall body 400 based on information about an obstacle detected by the detecting unit 110.

When the robot cleaner 1, which has traveled along the first wall surface 410, reaches the end of the first wall surface 410, the detecting unit 110 determines that the first wall surface 410 is not detected (410) and transfers the non-detection information to the controller 120.

Upon receiving the non-detection information, the controller 120 transfers the information to the storage unit 160 to store it (S420). In addition, the controller 120 may display the non-detection information of the first wall 410 on the display unit 140.

Upon receiving the non-detection information, the controller 120 transfers a signal to the driving unit 130 to make the robot cleaner 1 travel along the second wall surface 420 of the second wall body 400.

When the robot cleaner 1, which has traveled along the second wall surface 420, reaches the end of the second wall surface 420, the detecting unit 110 determines that the second wall surface 320 is not detected (S410) and transfers the non-detection information to the controller 120.

Upon receiving the non-detection information, the controller transfers it to the storage unit 160 to store it (S420).

The controller 120 determines whether or not the information stored in the storage unit 160 meets the first condition that the number of non-detections of the wall surfaces 410 and 420 by the detecting unit 110 is accumulated two times (S430).

When the first condition is met, the controller 120 makes the robot cleaner 1 enter the first travel region 50 in which the robot cleaner has traveled. If the first travel region 50 is determined to a previously cleaned region, the controller 120 makes the robot cleaner 1 travel to find a different cleaning target region.

Here, the first condition is determined to be met if non-detections of the wall surfaces 410 and 420 occur successively.

A travel path of the robot cleaner 1 under the second condition will now be described with reference to FIGS. 10 and 12.

Reference numeral 50 in FIG. 12 denotes the first travel region in which the robot cleaner is currently traveling, and 70 denotes a third travel region which the robot cleaner 1 enters newly. Reference numeral 600 denotes a first corner part, and 610 to 630 denote a first wall surface, a fist corner, and a second wall surface of the first corner part 600. Reference numeral 700 denotes a second corner part, and 710 to 730 denote a first wall surface, a second corner and a second wall surface of the second corner part 700.

When the robot cleaner 1 having the detecting unit 100 travels, the detecting unit 110 detects an obstacle on the travel path of the robot cleaner 1 (S400).

Information about the obstacle detected by the detecting unit 110 is transferred to the controller 120. Then, the controller 120 determines whether the obstacle is a wall surface. If the obstacle is a wall surface, the controller transfers a signal to the driving unit 130 so that the robot cleaner 1 can travel along the wall surface.

Through such processes, the robot cleaner 1 travels along the first wall surface 610 of the first corner part 600.

When the robot cleaner 1 which has traveled along the first wall surface 610 reaches the first corner 620, the detecting unit 110 determines that the first corner 620 is detected (S460) and transfers the corner detection information to the controller 120.

Upon receiving the information that the first corner 620 is detected, the controller 120 transfers the information to the storage unit 160 to store it (S470). The controller 120 may display the detection information of the first corner 620 on the display unit 140.

In addition, the controller 120 transfers a signal to the driving unit 130 to make the robot cleaner 1 travel along the second wall surface 620 after passing the first corner 620.

The robot cleaner 1, which has traveled along the second wall surface 630, travels along the first wall 710 of the second corner part 700.

When the robot cleaner 1, which has traveled along the first wall surface 710, reaches second corner 720, the detecting unit 110 determines that the second corner 702 is detected (S460) and transfers the corner detection information to the controller 120.

Upon receiving the corner detection information, the controller transfers it to the storage unit 160 to store it (S470).

The controller 120 determines whether or not the information stored in the storage unit 160 meets the second condition that the number of detections of the corners 620 and 720 by the detecting unit 110 is accumulated two times (S480).

Here, it may be determined that if detections of the corners 620 and 720 occur successively, the second condition is met.

When the second condition is met, the controller 120 recognizes the third travel region 70 in which the robot cleaner 1 is traveling as a new cleaning target space (S440) and execute the cleaning mode of the robot cleaner 1 on the corresponding region 70 (S450).

FIG. 12 shows the case that the robot cleaner 1 performs cleaning while traveling zigzags in the third travel region 70, but it is an exemplary case and various other travel patterns may be proposed.

After cleaning is completed on the third travel region 70, when the robot cleaner 1 reaches the third wall body 800, the robot cleaner 1 may move out of the third travel region 70 through the same processes as the space movement processes under the first conditions based on the information detected by the detecting unit 110.

As described above, the method for controlling the robot cleaner 1 is advantageous in that the robot cleaner 1 can be smoothly enter the new cleaning target space 600 and released therefrom.

In particular, even if the entrance of the new cleaning target space is narrow, the robot cleaner can be smoothly enter the new cleaning target space or released therefrom according to the method as described above.

Here, whether the first and second conditions are met may be determined separately, and as shown in FIG. 10, if an obstacle is detected (S400), whether or not a wall surface is not detected is determined (S410), and if this condition is not met, whether or not a corner is detected may be determined (S460).

After the obstacle detection (S400), of course, whether or not a corner is detected may be first determined and then whether or not the wall surface is not detected may be determined.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The invention claimed is:

1. A robot cleaner, comprising:
    a detecting unit that detects a cleaning region or a not-yet-cleaned region in a target cleaning region; and
    a controller that sets the detected cleaning region as a current cleaning region and that sets the detected not-yet-cleaned region as a new cleaning region and issues a cleaning command,
    wherein the detecting unit detects at least one of a surface of a wall or a corner when the robot cleaner travels through the target cleaning region, and
    wherein the controller recognizes a corresponding travel region of the robot cleaner as the target cleaning region based on at least one of a number of non-detections of the surface of the wall or a number of detections of the corner.

2. The robot cleaner of claim 1, wherein, when cleaning in the current cleaning region is completed and a not-yet-cleaned region is detected adjacent to a completion spot of the current cleaning region, the controller controls the robot cleaner to move to the detected not-yet-cleaned region.

3. The robot cleaner of claim 1, wherein, when at least one of a first condition or a second condition is met, the controller recognizes the corresponding travel region of the robot cleaner as the target cleaning region, wherein the first condition is a condition in which a number of non-detections of the surface of the wall is accumulated twice and the second condition is a condition in which a number of detections of the corner is accumulated twice.

4. The robot cleaner of claim 1, wherein if the non-detections of the surface of the wall and the detections of the corner occur successively, it is considered that the first and second conditions are met.

5. The robot cleaner of claim 3, wherein the robot cleaner comprises a storage unit for storing the number of non-detections of the surface of the wall and the number of detections of the corner.

6. The robot cleaner of claim 1, wherein the controller executes a cleaning mode of the robot cleaner with respect to a region recognized as the target cleaning region.

7. A method for controlling a robot cleaner including a detector that detects a position of the robot cleaner in a space to be cleaned, a driver that moves the robot cleaner, and a controller that controls operation of the robot cleaner, the method comprising:
    operating the detector and detecting a target cleaning space, setting a cleaning region within the detected target cleaning space, and cleaning the set cleaning region;
    operating the driver and moving the robot cleaner to a not-yet-cleaned region adjacent to a cleaning completion spot of the set cleaning region when the set cleaning region is completely cleaned; and
    setting, by the controller, the detected not-yet-cleaned region as a new cleaning region and performing a cleaning operation in the newly set cleaning region,
    wherein detecting a target cleaning space comprises operating the detector and detecting at least one of a surface of a wall or a corner when the robot cleaner travels through the target cleaning space, wherein the controller recognizes a corresponding travel region as the target cleaning space based on at least one of a number of non-detections of the surface of the wall or a number of detections of the corner.

8. The method of claim 7, wherein moving the robot cleaner to a not-yet-cleaned region comprises:
    determining, by the controller, whether or not there is a not-yet-cleaned region adjacent to the cleaning completion spot of the set cleaning region when cleaning of the set cleaning region is completed;
    setting, by the controller, the not-yet-cleaned region as the new set cleaning region when it is determined that the not-yet-cleaned region is adjacent to the cleaning completion spot of the previous set cleaning region; and
    operating the driver and moving the robot cleaner to the new set cleaning region.

9. The method of claim 7, further comprising correcting, by the controller, a location of the robot cleaner when an accumulated movement distance of the robot cleaner within the target cleaning space is greater than or equal to a pre-set reference distance, wherein the location of the robot cleaner is corrected based on a current position of the robot relative to a docking station.

10. The method of claim 7, wherein setting the not-yet-cleaned region as a new cleaning region comprises repeatedly performing a travel pattern in which the robot cleaner travels a certain distance and then changes a travel direction in the target cleaning space.

11. The method of claim 7, wherein setting the not-yet cleaned region as a new cleaning region comprises setting the new cleaning region based on a middle point of a certain travel distance calculated after the robot cleaner travels the certain distance in the target cleaning space.

12. The method of claim 7,
wherein when at least one of a first condition in which the number of non-detections of the surface of the wall is accumulated twice or a second condition in which the number of detections of the corner is accumulated twice is met, the controller recognizes the corresponding travel region as the target cleaning space.

13. The method of claim 12, further comprising:
storing, in a storage device of the robot cleaner, the number of non-detections of the surface of the wall and the number of detections of the corner as recognized by the detector.

14. The method of claim 13, wherein determining whether at least one of a first condition or a second condition is met comprises determining whether or not at least one of the first condition or the second condition is met based on the value stored in the storage device.

15. The method of claim 12, wherein determining whether at least one of a first condition or a second condition is met comprises determining that the first condition and the second condition are both met when the non-detections of the surface of the wall and the detections of the corner occur successively, respectively.

16. The method of claim 12, wherein recognizing the corresponding region as the target cleaning space further comprises performing a cleaning operation in the region recognized as the target cleaning space.

17. A method for controlling a robot cleaner including a detector, a driver, a controller and a storage device, the method comprising:
operating the detector and detecting a target cleaning space, setting a cleaning region within the detected target cleaning space, and cleaning the set cleaning region, wherein detecting the target cleaning space comprises:
detecting at least one of at least one wall surface forming the target cleaning space or at least one corner in the target cleaning space; and
recognizing a corresponding region as the target cleaning space when at least one of a first condition or a second condition is met, the first condition being a condition in which the robot cleaner does not detect the wall surface while traveling is accumulated twice, and the second condition being a condition in which the robot cleaner detects the corner is accumulated twice;
operating the driver and moving the robot cleaner to a not-yet-cleaned region adjacent to a completion point of the set cleaning region;
setting, by the controller, the not-yet cleaned region as a new cleaning region and performing a cleaning operation in the newly set cleaning region; and
correcting a location of the robot cleaner when an accumulated movement distance of the robot cleaner within the target cleaning space is greater than or equal to a pre-set reference distance.

* * * * *